US009380635B2

(12) United States Patent
Chisu et al.

(10) Patent No.: US 9,380,635 B2
(45) Date of Patent: Jun. 28, 2016

(54) DYNAMIC TCP LAYER OPTIMIZATION FOR REAL-TIME FIELD PERFORMANCE

(75) Inventors: Daniel C. Chisu, Franklin Park, IL (US); Daniel J. Declerck, Lake Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1127 days.

(21) Appl. No.: 13/346,070

(22) Filed: Jan. 9, 2012

(65) Prior Publication Data

US 2013/0176854 A1 Jul. 11, 2013

(51) Int. Cl.
*H04W 80/06* (2009.01)
(52) U.S. Cl.
CPC .................... *H04W 80/06* (2013.01)
(58) Field of Classification Search
CPC ............ H04W 28/0273; H04W 72/0413; H04W 72/042; H04W 72/085; H04W 80/06
USPC .................. 370/233, 234, 329, 413
See application file for complete search history.

(56) References Cited

U.S. PATENT DOCUMENTS

| 6,646,987 | B1  | 11/2003 | Qaddoura |
| 6,754,228 | B1  | 6/2004  | Ludwig |
| 7,061,856 | B2  | 6/2006  | Banerjee |
| 7,656,800 | B2  | 2/2010  | Morandin |
| 7,843,834 | B2  | 11/2010 | Picard |
| 8,274,884 | B1* | 9/2012  | Sarkar .......................... 370/229 |
| 2003/0219034 | A1* | 11/2003 | Lotter et al. .................. 370/469 |
| 2005/0041581 | A1* | 2/2005  | Kuusinen et al. ............. 370/230 |
| 2005/0147123 | A1  | 7/2005  | Asthana et al. |
| 2005/0169305 | A1  | 8/2005  | Mori |
| 2008/0101290 | A1* | 5/2008  | Sung et al. ..................... 370/331 |

(Continued)

FOREIGN PATENT DOCUMENTS

| DE | 102007044558 A1 | 1/2009 |
| EP | 2192706 A2      | 6/2010 |

(Continued)

OTHER PUBLICATIONS

Alcaraz et al., Optimizing TCP and RLC Interaction in the UMTS Radio Access Network, Apr. 2006, IEEE, pp. 1-10.*

(Continued)

*Primary Examiner* — Un C Cho
*Assistant Examiner* — Jeremy Costin
(74) *Attorney, Agent, or Firm* — Faegre Baker Daniels LLP

(57) ABSTRACT

A method and system that mitigates data session degradation over a radio link connection with an end server by allocating resources at a wireless communication device based on real-time radio frequency (RF) channel conditions. A performance tracking and resource allocation (PTRA) logic monitors radio access bearer (RAB) configuration and radio link quality for communication links between the WCD and the end server. The PTRA logic sets a maximum transmission unit (MTU) size parameter to a pre-established size associated with the measured radio link quality. In response to detecting a change in the RAB configuration, the PTRA logic performs a real-time round trip time (RTT) measurement utilizing individual RTTs associated with packet segments transmitted at a lower protocol layer. In addition, the PTRA logic modifies at least one of a transmission control protocol (TCP) receive window (RWIN) and a TCP transmit window (TWIN) using the real-time RTT measurements and RAB configuration.

20 Claims, 9 Drawing Sheets

(56) References Cited

U.S. PATENT DOCUMENTS

| | | | |
|---|---|---|---|
| 2009/0185625 A1* | 7/2009 | Lee et al. | 375/240.26 |
| 2009/0316581 A1 | 12/2009 | Kashyap et al. | |
| 2010/0054123 A1 | 3/2010 | Yong | |
| 2010/0322187 A1* | 12/2010 | Tani et al. | 370/331 |
| 2011/0205943 A1 | 8/2011 | Grimm et al. | |
| 2012/0137019 A1* | 5/2012 | Kotecha et al. | 709/233 |
| 2012/0257568 A1* | 10/2012 | Cai et al. | 370/328 |
| 2013/0136090 A1* | 5/2013 | Liu et al. | 370/329 |

FOREIGN PATENT DOCUMENTS

| | | | |
|---|---|---|---|
| WO | 0193513 | A2 | 12/2001 |
| WO | 03081873 | A1 | 10/2003 |
| WO | 2004036845 | A1 | 4/2004 |
| WO | 2005002148 | A1 | 1/2006 |
| WO | 2006104341 | A2 | 10/2006 |
| WO | 2007113822 | A2 | 10/2007 |

OTHER PUBLICATIONS

Patent Cooperation Treaty, International Search Report and Written Opinion of the International Searching Authority for International Application No. PCT/US2012/071609, Apr. 19, 2013, 16 pages.

* cited by examiner

FIG. 6

| Signal quality (EcNo) | Channel rank and description | MTU size | Transmit buffer size | Receive buffer size |
|---|---|---|---|---|
| R1 = [Amin Amax] | Rank 1 : description 1 | size L | Size N | Size P |
| R2 = [Bmin Bmax] | Rank 2: description 2 | size M | Size U | Size V |
| ...... | ...... | ...... | | |
| EcNo = [higher quality range] | High rank: Good channel | Larger MTU size | Larger Tx buffer size | Larger Rx buffer size |
| EcNo = [medium quality range] | Medium rank: Average channel | Medium MTU size | Medium Tx buffer size | Medium Rx buffer size |
| EcNo = [lower quality range] | Low rank: Poor channel | Smaller MTU size | Smaller Tx buffer size | Smaller Rx buffer size |
| | ...... | ...... | | |

600

602, 604, 606, 608, 610

DYNAMIC TCP LAYER OPTIMIZATION FOR REAL-TIME FIELD PERFORMANCE

BACKGROUND

1. Technical Field

The present disclosure relates in general to wireless communication devices and in particular to optimizations at a wireless communication device to alleviate the triggering of Transmission Control Protocol network congestion and set the Maximum Transmission Unit (MTU) size.

2. Description of the Related Art

In current wireless communication device (WCD) platforms, Transmission Control Protocol (TCP) layer optimization is performed at an initialization period based on a selected radio access technology (RAT), a maximum WCD capability and worst-case RTT (Round Trip Time). The optimization does not take into account varying types of field conditions, and there is no precise optimization based on memory use of the WCD and maximum transmission unit (MTU) selection. This conventional approach to optimization can lead to degraded throughput due to retransmissions and early congestion at the TCP level. As a result, the WCD can only achieve sub-optimal throughput in both static and mobile conditions. Poor throughput performance is exacerbated by maintaining an unnecessary and inappropriate allocation of TCP memory buffers and other resources at the WCD.

BRIEF DESCRIPTION OF THE DRAWINGS

The described embodiments are to be read in conjunction with the accompanying drawings, wherein:

FIG. 6 is a table of pre-established signal quality ranges and associated values for a maximum transmission unit (MTU) size parameter, according to one embodiment;

DETAILED DESCRIPTION

Figure 1:
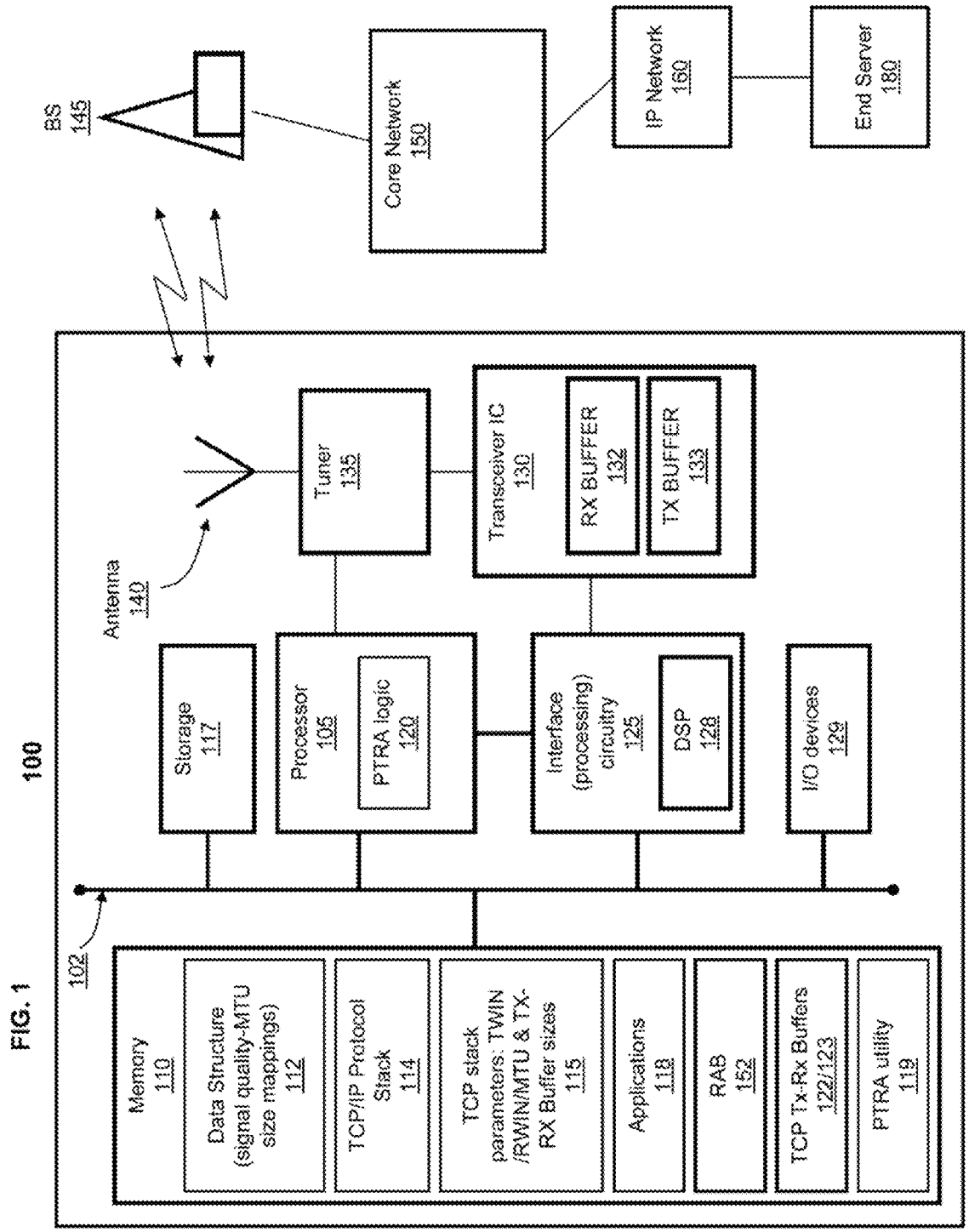
FIG. 1 illustrates a block diagram of a component-level architecture for an example wireless communication device (WCD), within which certain of the functional aspects of the described embodiments can advantageously be implemented.

The illustrative embodiments provide a method and system for mitigating data session degradation over a radio link connection with an end server by allocating resources at a wireless communication device (WCD) based on real-time radio frequency (RF) channel conditions. Performance tracking and resource allocation (PTRA) logic executing within the WCD monitors radio access bearer (RAB) configuration data for an uplink communication and a downlink communication with the end server. In addition, the PTRA logic measures a radio link quality for a downlink communication channel of the WCD and sets a maximum transmission unit (MTU) size parameter to a pre-established size that is associated with the measured radio link quality. In response to detecting a change in the RAB configuration, the PTRA logic performs a real-time round trip time (RTT) measurement utilizing individual RTTs associated with packet segments transmitted at a lower protocol layer. In addition, the PTRA logic modifies at least one of a transmission control protocol (TCP) receive window (RWIN) and a TCP transmit window (TWIN) using the real-time RTT measurement.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility, logic, and/or firmware described herein) or the corresponding acronym(s) are for example only and not meant to imply any limitations on the described embodiments. The embodiments may thus be described with different nomenclature and/or terminology utilized to describe the components, devices, and/or parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features described herein is provided within processing devices and/or processing structures and can involve use of a combination of hardware, firmware, as well as several software-level constructs (e.g., program code) that execute to provide a specific utility for the device. The presented figures illustrate both hardware components and software/logic components within example wireless communication device architecture.

Referring now to FIG. 1, there is depicted a block diagram of component-level architecture of an example wireless communication device 100, within which certain of the functional aspects of the described embodiments can advantageously be implemented. For simplicity, wireless communications device 100 shall be referred to herein simply by the acronym WCD 100. WCD 100 can, for example, be a mobile device, a mobile station, a cell phone, a smart-phone, a laptop, or mobile computer, or other device that supports transmission control protocol (TCP) transmission over a wireless interface. WCD 100 comprises a plurality of functional components, including processor 105, memory 110, and communication interface processing circuitry 125. Communication interface processing circuitry 125 which comprises digital signal processor (DSP) 128 that controls the communication and other signal processing functions and/or operations of WCD 100. Processor 120 is connected to memory 110 via bus interface 102. In addition, processor 105 is coupled via bus interface 102 to other persistent storage 117 and one or more input/output (I/O) components generally illustrated as I/O devices 129. The various I/O components can enable user interfacing with WCD 100.

In addition to the above components, WCD 100 can also include other components utilized to enable standard voice, data, and/or multimedia communication from and/or to WCD 100. Among these components is wireless transceiver 130, which is connected by antenna tuner 135 to antenna 140 to enable communication of radio frequency (RF) and/or wireless signals from and to WCD 100. The number of antennas can vary from device to device, ranging from a single antenna to two or more antennas, and the presentation within WCD 100 of one antenna is merely for illustration. Within wireless transceiver 130 are receive buffer 132 and transmit buffer 133.

WCD 100 is able to wirelessly communicate with another device such as for example, base-station (BS) 145 within a wireless environment and/or wireless network, via antenna 140. In a Long Term Evolution (LTE) Communication System, the functionality associated with base station 145 is provided by an evolved Node B (eNodeB) and as such, base station 145 can be referred to as eNodeB in an LTE implementation. In one embodiment, WCD 100 is a subscriber device to a wireless communications core network 150 and WCD 100 wirelessly connects to the infrastructure of wireless communications core network 150 via base station (BS) 145. In addition, WCD 100 can access Internet Protocol (IP) network 160 through core network 150 to communicate with end server 180. A controller associated with base station 145, such as BSC/RNC 210 of FIG. 2, described hereafter, provides radio access bearer (RAB) configuration data 152 for an uplink communication and a downlink communication with the end server 180.

In addition to the above hardware components, several functions of WCD 100 and specific features of the disclosure may be provided as functional code and/or data that is stored within memory 110 and/or other storage 117 and executed on or utilized by processor 105. In particular, memory 110 comprises data structure 112. Data structure 112 comprises one or more pre-established associations between signal quality and an MTU size parameter as well as other TCP stack parameters. Within data structure 112, these associations with signal quality can be provided by one or more tables, such as the example table 600 presented by FIG. 6, which is described below. Also stored within memory 110 is TCP/IP stack 114 and associated TCP stack parameters 115 which include an MTU size parameter, a TCP receive window (RWIN) size parameter and a TCP transmit window (TWIN) size parameter. In addition, TCP stack parameters 115 include a transmit buffer size parameter and a receive buffer size parameter. Memory 110 also includes TCP transmit and receive buffers collectively illustrated as TCP Tx-Rx buffers 122/123, which in one or more embodiments described herein can be adjusted in size. Also included in memory 110 are one or more applications 118 which include at least one IP based application such as a web browser. Memory 110 further includes performance tracking and resource allocation (PTRA) utility 119.

According to one implementation, processor 105 can execute PTRA utility 119 and the processor execution of PTRA utility 119 generates PTRA logic 120, which causes WCD 100 to perform and/or provide the following functions, among others: (a) monitoring of signal quality of a communication channel between WCD 100 and server 180; (b) monitoring receipt of uplink and downlink RAB configuration data 152 provided by RNC 210; (c) detecting changes in signal quality; (d) retrieving a data structure of pre-established associations between signal quality and an MTU size parameter; (e) selecting a value for MTU size using the pre-established associations and a measured signal quality range; (g) detecting changes to an RAB configuration; (h) in response to detecting changes in the RAB configuration, calculating a real-time round trip time (RTT) using individual RTTs corresponding to PDUs on a lower protocol layer; (i) calculating an uplink and downlink bandwidth delay product (BDP) using the real-time RTT; and (j) determining and configuring the RWIN and TWIN based on the calculated uplink and downlink BDP. The above listed functions represent a subset of the functional processes of the described embodiments, which processes are expanded upon below and illustrated in part by the flow charts of FIGS. 7, 8 and 9, as well as the other figures.

Figure 2:
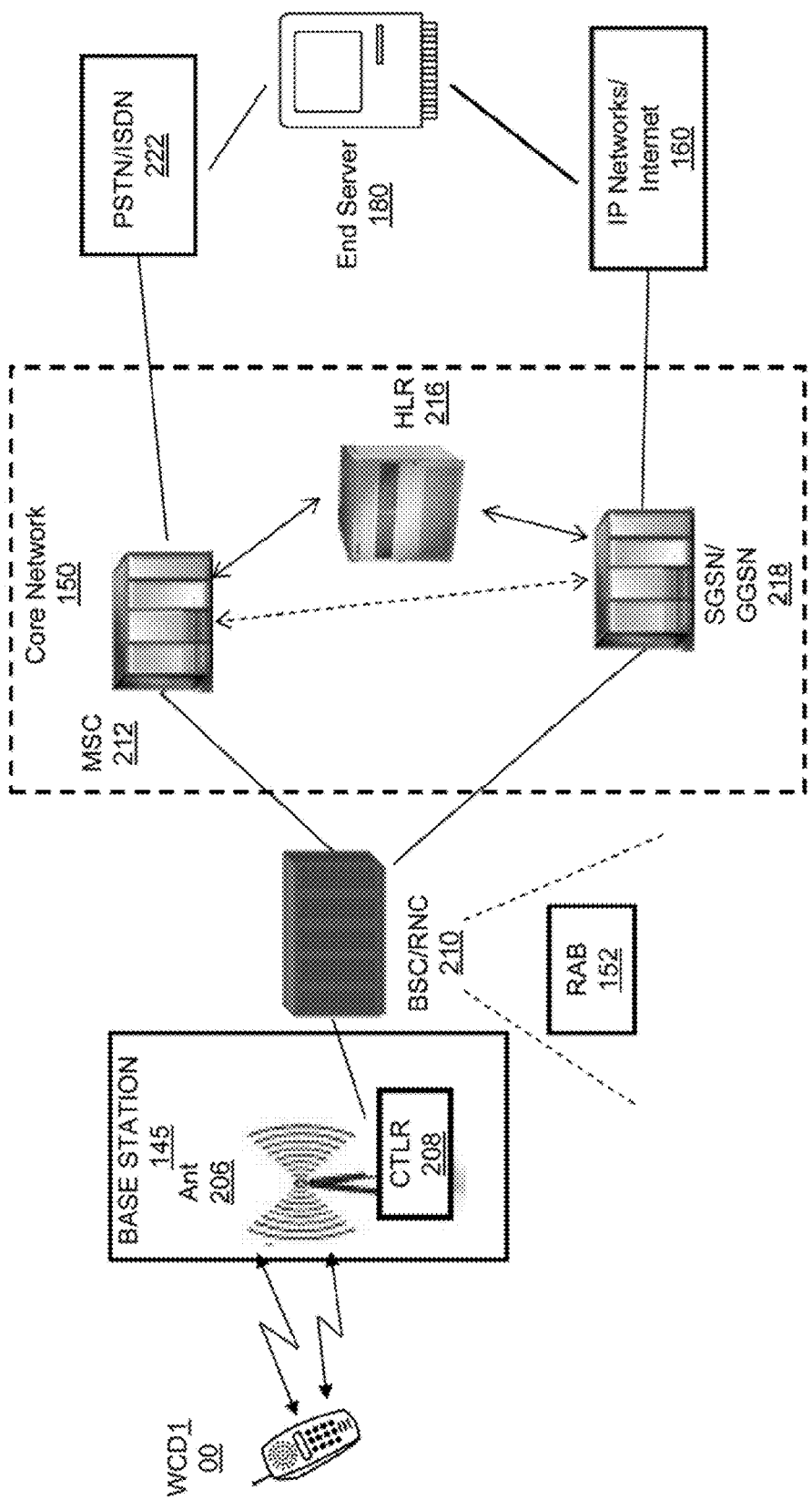
FIG. 2 illustrates a block diagram representation of a wireless communication network (WCN) within which the WCD of FIG. 1 can be deployed, according to one embodiment.

Referring now to FIG. 2, there is illustrated a block diagram representation of an example wireless communication network (WCN), according to one embodiment. WCN 200 comprises WCD 100 which is connected by BS 145 and particularly by controller 208 to radio network controller (RNC) 208. As shown, BS 145 can include an antenna 206 as well as controller 208. In an LTE communication system, an eNodeB is provided in lieu of a conventional base-station to connect WCD 100 to RNC 210. In this implementation, eNodeB also provides other functions including functions similar to those that can be provided by a base-station such as BS 145. WCN 200 also includes core network 150 communicatively coupled to RNC 210. Core network 150 includes mobile switching center (MSC) 212, home location register (HLR) 216, and Serving General Packet Radio Service (GPRS) Support Node (SGSN)/Gateway GSN (GGSN) 218 both communicatively connected to RNC 210 MSC 212 is the primary service delivery node for Global System for Mobile Communications (GSM) and/or Cell Division Multiple Access (CDMA) wireless protocols, and MSC 212 is responsible for routing voice calls and Short Message Service (SMS) as well as other services, such as conference calls, facsimile and circuit switched data, between user devices connected to core network 150. HLR 216 is the primary database of permanent subscriber information for a particular mobile network. SGSN/GGSN 218 is a major component of the packet switching domain of core network 150 and enables the communication of IP packets between WCD 100 and end server 180. End server 180 is connected to an external network such as the Internet 160. In one or more embodiments, external server 180 can be a web server. WCN 200 can also include public switched telephone network (PSTN) and/or integrated services digital network (ISDN), collectively illustrated as PSTN/ISDN 222, through which access by WCD 100 to end server 180 can also be established, in one embodiment. Core network 150, SGSN/GGSN 218, as well as other network components, provides specific functionality that are described in greater detail in the description of FIGS. 3-9 hereinafter.

Those of ordinary skill in the art will appreciate that the hardware depicted in FIGS. 1 and 2 may vary depending on implementation. Other internal hardware or peripheral devices may be used in addition to or in place of the hardware depicted in FIGS. 1 and 2. Thus, the depicted examples are not meant to imply architectural limitations with respect to the presented embodiments.

Figure 3:
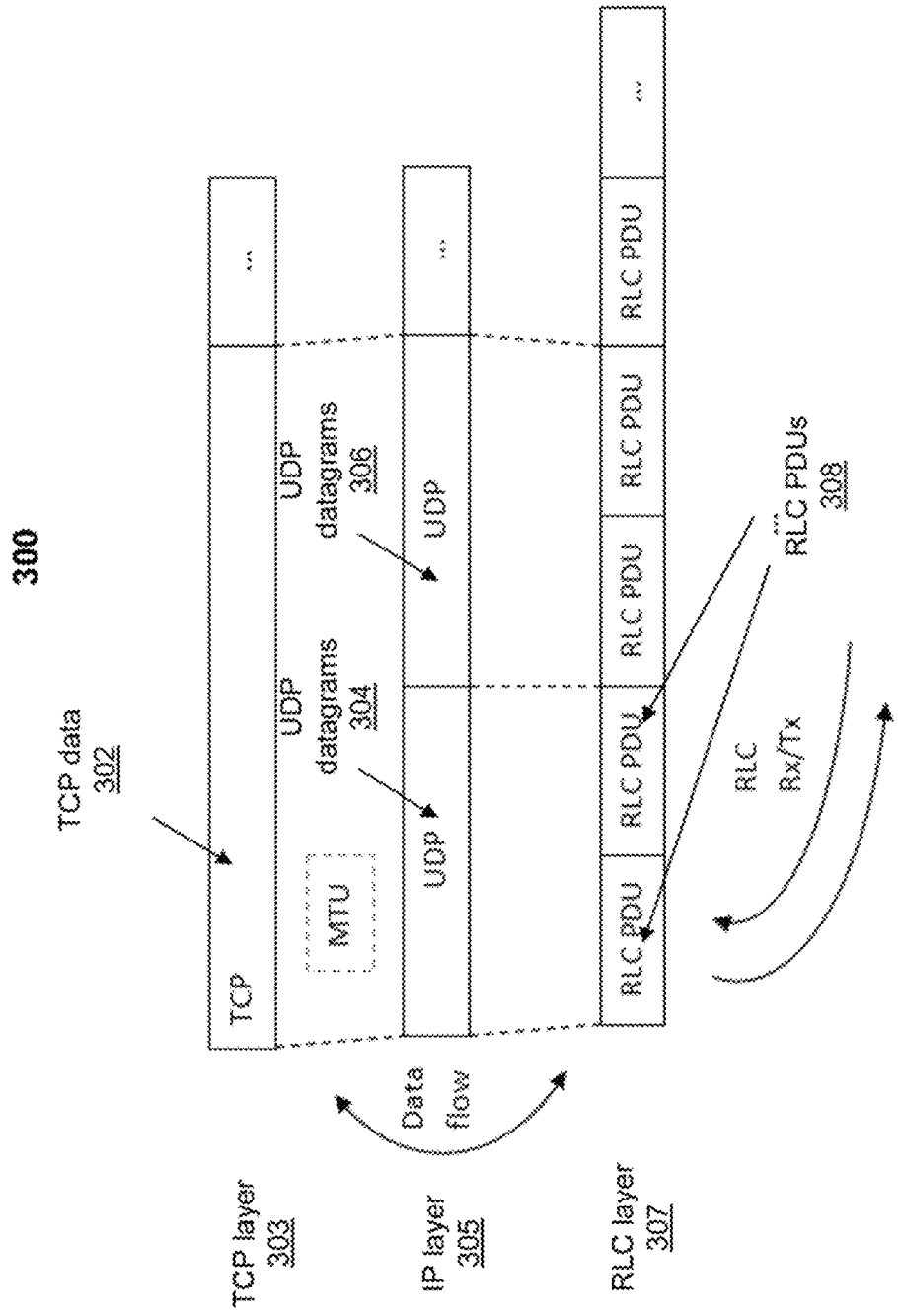
FIG. 3 illustrates data blocks that are generated at different lower protocol layers for communication between the WCD and an end server utilizing transmission control protocol (TCP), according to one embodiment.

FIG. 3 illustrates data blocks within the data configuration view 300 generated across different protocol layers for communication between the WCD 100 and the end server 180, according to one embodiment. During TCP processing at WCD 100, a data packet is segmented into smaller blocks of data as the packet travels down from the upper TCP layer to the lower layer at which the outgoing packet can be ultimately transmitted. These lower layers also represent the layer(s) at which incoming packet data is received as a plurality of individual blocks of data that are ultimately combined into a larger data packet as the received data is passed up the layers of the TCP stack for processing at and/or consumption by the WCD 100. Three layers are represented within data configuration view 300, namely TCP layer 303, IP layer 305, and radio link control (RLC) layer 307. In one embodiment, both the TCP and IP layers represent higher protocol layers and thus, the TCP and IP protocols represent higher layer protocols. On the other hand, the RLC protocol represents a lower layer protocol. However, other lower layer protocols can include a Radio Link Protocol (RLP), a Packet Data Convergence Protocol (PDCP) and a Hybrid Automatic Repeat-Request (HARQ) protocol. Thus, the generation of data and processing of data at the representative RLC layer may be applied to other lower protocol layers, according to the described embodiment. TCP layer 303 provides TCP data 302. IP layer 305 provides first User Datagram Protocol (UDP) datagram 304 and second UDP datagram 306 corresponding to segmented TCP data 302. In addition, RLC layer 307 includes several protocol data units (PDUs) 308, which represent further segmentation of first UDP datagram 304 and second UDP datagram 306. While only two PDUs are presented within the figure, it is appreciated that each UDP datagram 304 can be segmented in much larger number of PDUs 308, and the presentation of only two PDUs is for illustration only. As illustrated, PDUs 308 can also be referred to herein as RLC PDUs 308. With this structure or configuration of data packet components within different protocol layers, the below described aspects of the disclosure will then be presented from the perspective of lower layer PDUs such as RLC PDUs and a lower-layer RTT such as an RLC RTT, which is also referred to herein as an rlcRTT. However, it is appreciated that the functionality described herein can also be applied to other lower layer protocols, such as, but not limited to, radio link protocol (RLP), HARQ, and packet data convergence protocol (PDCP). Thus within the below descriptions and the disclosure as a whole, any one of these lower layer protocols can be interchangeably utilized in place of, or substituted for, RLC and the embodiments can thus be generally described with reference to a lower-layer RTT. For consistency, the specific embodiments presented herein are described from the perspective of the RLC layer, with RLC PDUs, RLC protocol, and corresponding rlcRTT, without limiting the disclosure to operations involving that specific lower layer protocol.

When WCD 100 establishes a TCP connection with server 180 by, for example, execution of application 118, application data is presented as IP packets and/or UDP datagrams at IP layer 305. WCD 100/PTRA logic 120 uses a value for a maximum transmission unit (MTU) as an upper limit for the size of a UDP datagram. The IP layer and/or other higher protocol layers utilize the services of the lower layers such as RLC layer 307 to transmit data, including PDUs 309, across the network to server 180. The RLC layer 307 provides a reliable link for uplink and downlink communication between WCD 100 and Base-Station 145. RLC layer 307 is responsible for segmentation of UDP datagrams, such as first UDP datagram 304, and/or IP packets into RLC PDUs 308. RLC layer 307 supports two modes of operation, an acknowledged mode and an unacknowledged mode. In RLC acknowledged mode, RLC layer 307 ensures the selective retransmission of RLC data units that have not been correctly decoded by server 180. Thus, the acknowledged mode is used to achieve a high reliability in the transmission of TCP data. In RLC unacknowledged mode, RLC data units or PDUs that have not been correctly decoded are not retransmitted by the sending entity. This mode is used for applications that are tolerant of error and that request a constant throughput, such as streaming applications including video or audio streaming. Other lower layer protocols may be used for the transmission and/or re-transmission of data packets. For example, in one embodiment, when re-transmissions are necessary because of transmission errors, the Hybrid Automatic Repeat Request (HARD) protocol is used to control packet re-transmissions at the physical protocol layer, which is below the RLC layer.

According to one aspect of the disclosure, PTRA logic 120 triggers and/or configures physical components of WCD 100 to perform real-time tracking of RF conditions affecting an RF data communication link between WCD 100 and server 180 in a wireless communications network. PTRA logic 120 receives real-time feedback that provides information about current RF conditions affecting, or which can affect, operation of WCD 100, and PTRA logic 120 uses this feedback information to mitigate TCP data session degradation over an RF connection link with server 180.

PTRA logic 120 monitors bandwidth allocation and/or availability, and in particular, changes in bandwidth allocation, for at least one of an uplink communication link and a downlink communication link with end server 180, in order receive an indication of the current RF conditions. In one embodiment, PTRA logic 120 monitors bandwidth allocation by specifically monitoring a RAB configuration 152 (FIG. 1). The RAB refers to a protocol used to communicate packet data over a data communication link. The RAB configuration is provided by the Radio Network Controller (RNC). The RAB represents the logical connection between WCD 100 and core network 150. RAB configurations are service specific so that a WCD that is simultaneously using multiple services can have multiple RABs. For example, if WCD 100 is being used to browse the internet and download emails, WCD 100 can have two RABs to the packet switched (PS) core network. RNC 210 uses the RAB to assign radio access resources. In one embodiment, PTRA logic 120 initiates a request to core network 150 for the RAB for a particular type of service associated with use of a particular application.

Referring to FIG. 2, SGSN 218 analyses current resource availability and service load within core network 150. Based on the current resource availability and service load, SGSN 218 sends a request to RNC 210 to allocate resources to WCD 100 according to an RAB assignment request. RNC 210 maps information provided in the assignment request to actual resource requirements. RNC 210 directs BS 145 to configure a set of allocated resources. When the resources are in place, RNC 210 provides a notification to WCD 100 and provides an assignment response to SGSN 218. In one embodiment, RNC 210/SGSN 218 further notifies WCD 100 of any changes in RAB resource allocation.

In one embodiment, the RAB configuration includes an uplink RAB configuration components and a downlink RAB configuration component. The uplink RAB configuration provides an uplink maximum bandwidth and an allowed uplink frame size, while the downlink RAB configuration provides a downlink maximum bandwidth and an allowed downlink frame size. PTRA logic 120 tracks and responds to changes in the RAB configuration, which includes responding to changes detected in the bandwidth allocation.

In response to detecting a change in the RAB configuration, PTRA logic 120 performs a real-time round trip time (RTT) measurement utilizing round trip time intervals corresponding to TCP packet transmission using a lower protocol layer. For example, measurement can be performed for data transmission at the radio link control (RLC) layer. In particular, according to one embodiment, IP packets or UDP datagrams generated at the IP layer are segmented at the RLC layer into RLC PDUs. In acknowledged mode, transmission of an RLC PDU is associated with an individual RLC RTT. Thus, according to one aspect of the disclosure, PTRA logic 120 determines a real-time round trip time (RTT) utilizing individual RTTs corresponding to packet segments such as PDUs 309 (FIG. 3) transmitted at the lower layer (e.g., the RLC layer).

Figure 4:
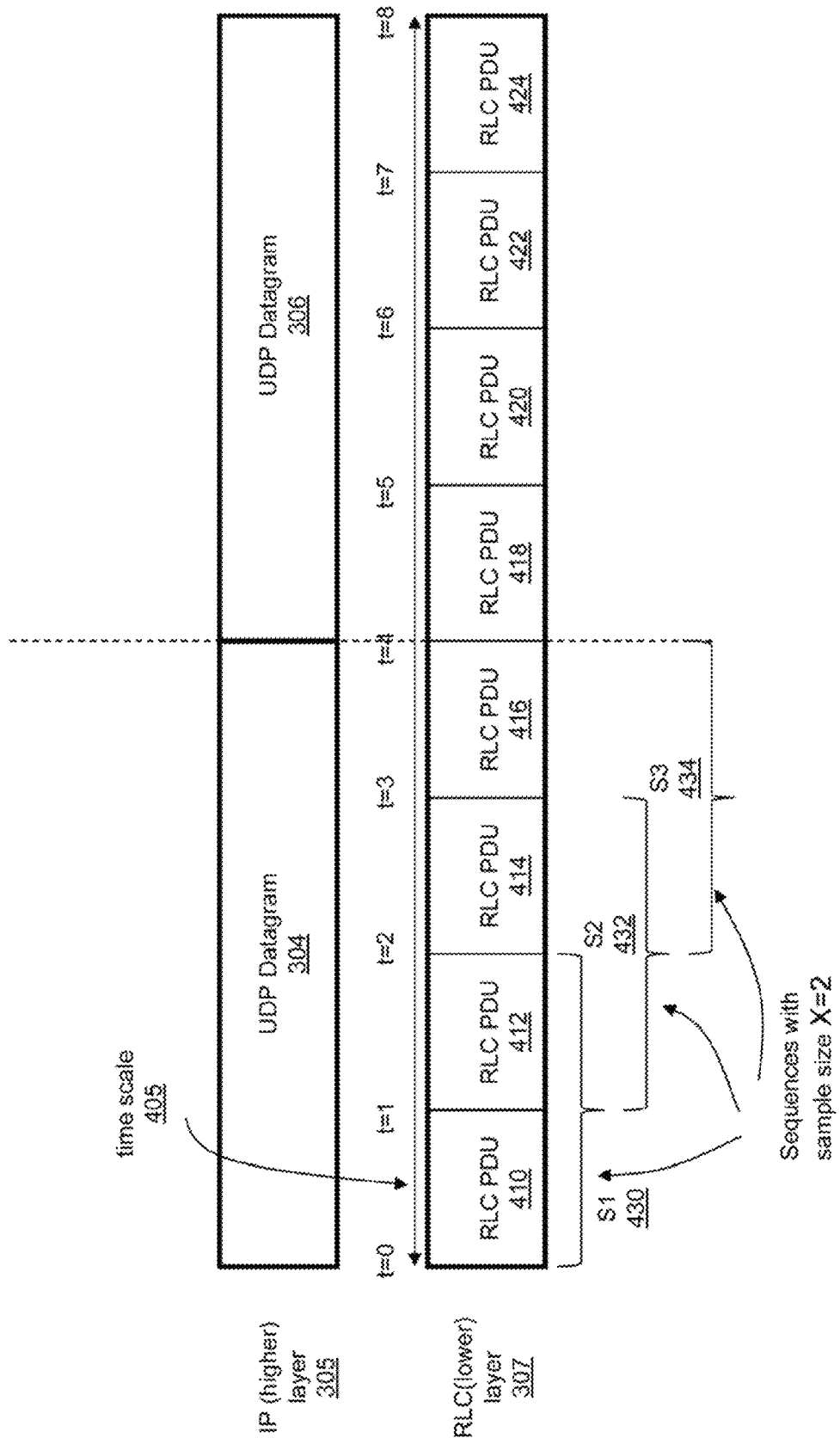
FIG. 4 illustrates data blocks that are generated at the Internet Protocol (IP) and Radio Link Control (RLC) layers for communication between the WCD and the end server, according to one embodiment.

FIG. 4 illustrates data block configurations that are generated at the IP and RLC layers for transmission between the WCD 100 and the end server 180, according to one embodiment. Data configuration 400 comprises IP layer 305 and RLC layer 307, which are respectively referred to as higher layer and lower layer relative to the layer's position within the TCP stack. IP layer 305 includes first UDP datagram 304 and second UDP datagram 306 as two examples of the large number of such components that can exists and/or be generated at IP layer 305. Within RLC layer 307, each of first UDP datagram 304 and second UDP datagram 306 is further segmented into four RLC PDUs. Specifically, first UDP datagram 304 is segmented into first RLC PDU 410, second RLC PDU 412, third RLC PDU 414 and fourth RLC PDU 416. Similarly, fifth RLC PDU 418, second RLC PDU 420, third RLC PDU 422 and fourth RLC PDU 424 correspond to segmentation of second UDP datagram 306. The number of RLC PDUs that are generated from a single UDP datagram is determined according to the associated channel conditions, and the use of four RLC PDUs in association with a single UDP datagram within data configuration 400 is provided for illustration purposes only.

According to one aspect of the disclosure, in order to transmit TCP data at the lower RLC layer, a UDP datagram is segmented into "Y" packet segments or protocol data units (PDUs), where Y is an integer value greater than 1. The RLC PDUs are sequentially transmitted in order from a first PDU to a last PDU to server 180 as a sequence of Y PDUs. After transmission of each RLC PDU, server 180 sends an acknowledgment of a successful transmission and receipt of the corresponding RLC PDU. Receipt of the acknowledgment at WCD 100 triggers transmission of a next RLC PDU of the sequence until the last RLC PDU is transmitted. WCD 100 transmits the RLC PDUs from an uplink transmit buffer, e.g., transmit buffer 133. In at least one embodiment, the next RLC PDU in the sequence is transmitted after a known interval of time, i.e., a latency interval, which follows receipt of the acknowledgment for the previously transmitted PDU. In one embodiment, receipt of the acknowledgement of successful transmission of the last RLC PDU in a sequence of Y RLC PDUs represents receipt of an acknowledgement of successful transmission of the UDP datagram. Furthermore, in response to successful transmission of a UDP datagram, an RTT can be generated at the TCP layer. The RTT at the TCP layer, referred to hereinafter as the TCP RTT, substantially corresponds to a time interval between transmission of a first RLC PDU and receipt of an acknowledgment for successful transmission of the last RLC PDU corresponding to the UDP datagram. Thus, on the higher TCP layer, the RTT is received only after successful transmission of the complete UDP datagram, which corresponds to successful transmission of the "Y" RLC PDUs of the lower, RLC layer. However, as provided by one aspect of the disclosure, an individual lower-layer RTT, e.g., an rlcRTT, can be generated in response to successful transmission of each individual lower-layer PDU, such as an RLC PDU at the RLC layer. As further provided by the disclosure, in order to more efficiently and/or quickly provide feedback based on rapidly changing RF conditions, PTRA logic 120 generates a real-time RTT that is directly associated with transmission of the individual RLC PDUs. PTRA logic 120 generates this real-time RTT rather than wait for a completion of transmission of the entire UDP datagram and/or the TCP packet and TCP RTT determination at the higher protocol layers.

According to one embodiment, PTRA logic 120 initiates a generation of a real-time RTT by selecting a sequence length for RLC PDUs and determining individual RTTs corresponding to each PDU within the sequence and accounting for the relevant latency intervals corresponding to PDUs within the selected sequence length. Then, in order to determine a real-time RTT that reflects current channel conditions, PTRA logic 120 utilizes a current sequence of individual RTTs of the sequent length that has been successfully transmitted. The real-time RTT is a projected estimate that can be evaluated without waiting for a successful transmission of all Y PDUs. In addition, the real-time RTT includes an estimated sum of individual RTTs and an estimated sum of latency intervals. As introduced above, a latency interval is a time-span between a receipt of an acknowledgement of a successful transmission of a first PDU and transmission of a second PDU, where transmission of the second PDU sequentially follows transmission of the first PDU. The latency interval corresponds to latency experienced by the next/second PDU prior to transmission of the second PDU.

PTRA logic 120 selects a sample size for the sequence of PDUs that are transmitted at the lower layer such as the RLC layer. In one embodiment, the sample size, described as sample size "X", is pre-determined based on performance testing results, where X is an integer greater than 1 and less than or equal to Y. According to one embodiment, in performing the pre-determination of the sample size, a series of different real-time RTTs can be measured and/or calculated for various sample sizes and compared against the TCP RTTs corresponding to a same timeframe. The resulting real-time RTTs can then be analyzed to determine the probability that a future calculation of real-time RTT falls within a specific range (or percentage) of the actual TCP RTT. The sample size X is used to identify a number of PDUs within a sequence of PDUs that corresponds to a number of individual RTTs which are used to estimate the real-time RTT. According to one aspect, the first sample size X corresponds to a first real-time RTT that has a known and/or pre-determined probability of being within a pre-established range (e.g., a small delta) of a corresponding TCP RTT generated at the higher layer. The pre-established range provides an acceptable offset from the actual TCP RTT within which the real-time RTT is expected to fall. Thus, for example, the sample size X may yield an estimated RTT, which corresponds to a first real-time RTT that has a 95% probability of being within a +/−5% range of the actual TCP RTT that could be measured at the higher layer.

The first sample size X can be selected from a specific range of values between a minimum and a maximum value. By utilizing a smaller value for X, PTRA logic 120 uses less processing resources to generate a real-time RTT value. In addition, selecting a smaller value for X, PTRA logic 120 can better measure an impact of current RF conditions in a rapidly changing RF environment. In one embodiment, in order to select a smaller value for X that better reflects rapidly changing conditions, a slightly lower probability can be used and/or a larger acceptable offset can be used to determine X. However, by selecting a larger value for X, PTRA logic 120 achieves greater accuracy in predicting the corresponding RTT. According to one embodiment, a low-pass filter, such as a finite impulse response (FIR) filter that applies the acceptable offset to real time RTT can be used to facilitate a selection of the sample size X that meets a desired probability. In one embodiment, PTRA logic 120 applies a moving average to a calculation of real-time RTT. By this calculation involving a moving average, individual RTTs from more recently transmitted PDUs are more heavily weighted in the calculation. The use of the moving average is another method by which transmission time measurements can become more aligned with fast changing RF conditions.

Using the selected sample size, PTRA logic 120 calculates the real-time RTT by extrapolation of (a) the sum of the individual RTTs to obtain an estimated RTT sum for Y individual RTTs and (b) a sum of the relevant latency intervals to obtain an estimated latency interval sum for Y−1 individual latency intervals. PTRA logic 120 obtains the real-time RTT by adding the estimated RTT sum to the estimated latency interval sum.

Referring again to FIG. 4, a time scale is illustrated above PDUs at the RLC layer 307, running form time t=0 through time t=8. PTRA logic 120 can select a sequence length of 1 to 4 PDU samples. Assuming two PDU samples are selected (i.e., X=2), PTRA logic 120 is able to generate a real-time RTT at times t=2, t=3 and t=4, after any two sequential RLC PDUs corresponding to a single UDP datagram are successfully transmitted. Thus sequence 1 (S1) 430 can be utilized to perform the RTT determination. Likewise, S2 432 and/or S3 434 can be utilized, rather than requiring all of PDUs 410-416 to perform the TCP RTT calculation. FIG. 4 illustrates an ideal sequencing of PDU transmission relative to the time line, where there are no delays shown between the transmission of each PDU. However, it is appreciated that in practical application, as presented by FIG. 5 below, additional time delays can be inherent in the buffering and transmission of the sequence of PDUs. An example calculation of the real-time RTT using a sequence length of 2 as shown in FIG. 4 is provided in the description of FIG. 5.

Figure 5:
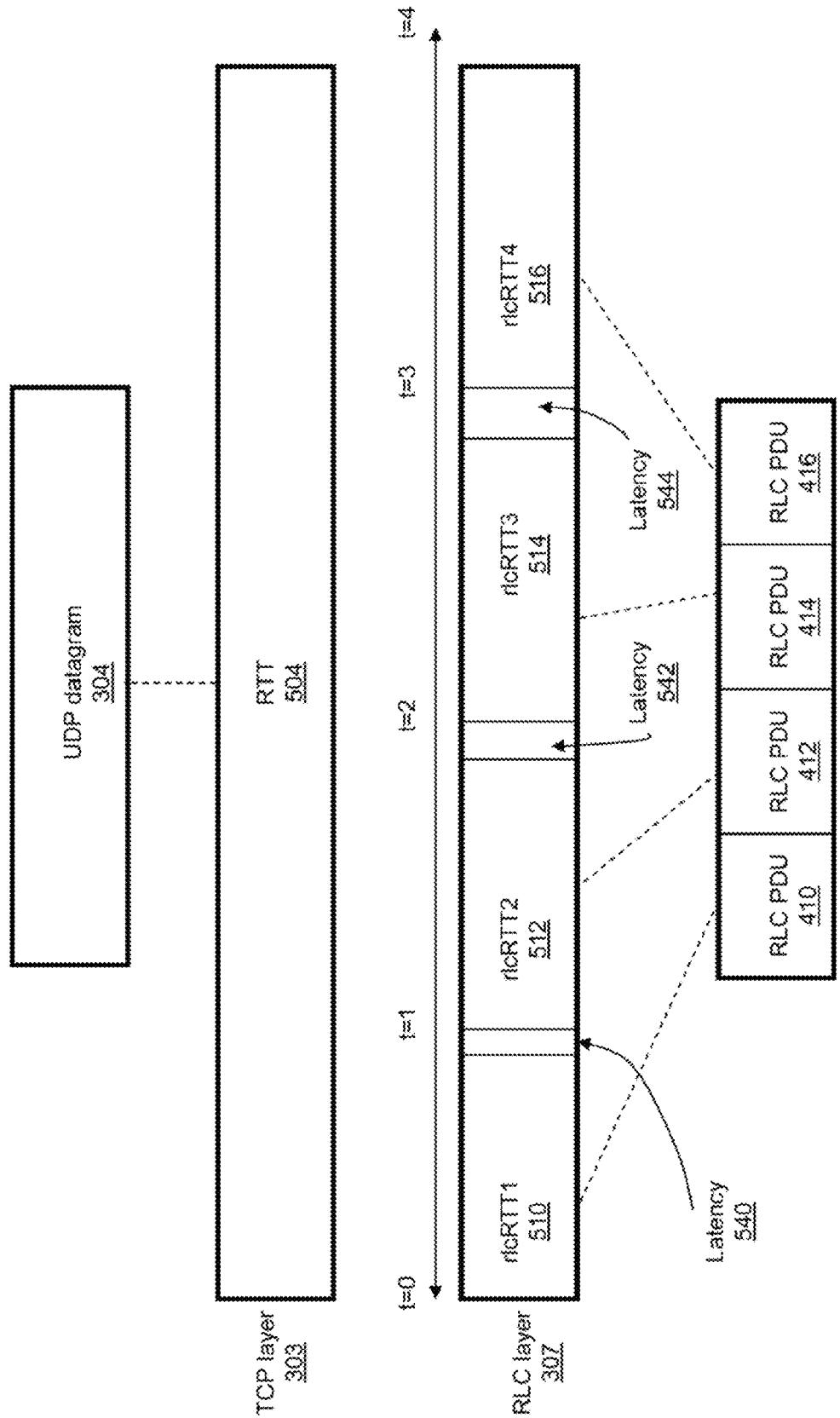
FIG. 5 illustrates round trip times (RTTs) corresponding to successful transmission of the various data blocks that are generated at the different lower layers for communication between the WCD and the end server, according to one embodiment.

FIG. 5 illustrates a view of RTTs for the various data blocks that are generated at the different protocol layers for communication between the WCD 100 and the end server 180, according to one embodiment. RTT view 500 comprises TCP RTT 504 generated at the TCP layer 303. TCP RTT 504 corresponds to first UDP datagram 304. In addition, RTT view 500 comprises several individual RTTs at RLC layer 307. Each one of the individual RTTs is illustrated as an rlcRTT. First rlcRTT 510, second rlcRTT 512, third rlcRTT 514 and fourth rlcRTT 516 correspond to transmission of first RLC PDU 410, second RLC PDU 412, third RLC PDU 414 and fourth RLC PDU 416, respectively.

As illustrated within RTT view 500, the rlcRTTs can be intervals having different time-spans along a time scale. The time-scale illustrates several time instants such as t=1, t=2, and t=3, that are aligned with a corresponding transmission time of an individual PDU. RTT view 500 also illustrates latency components associated with transmission of each PDU, except the first PDU (i.e., from the second PDU to the last of the Y PDUs transmitted from the buffer). Thus PDU 412 has an associated first latency 540, PDU 414 has second latency 542, and PDU 416 has third latency 544. The latency intervals can have different time-spans relative to each other. In one embodiment, the latency intervals represent a time interval between receipt of an acknowledgement of successful transmission of a first/preceding PDU of a pair of PDUs in the sequence and a transmission, from the transmission buffer, of a next, second PDU of the pair of PDUs in the sequence. As described earlier, X represents the selected PDU sequence length and Y represents the number of lower layer PDUs that correspond to a single UDP Datagram or higher protocol layer packet. In one embodiment, "X" is selected by using a Finite Impulse Response (FIR) filter that is specifically configured so that X provides an acceptable estimate of a corresponding TCP RTT. In the example of FIG. 5, X is equal to 2 and Y is equal to 4. At time t=2, PTRA logic 120 selects first sequence S1 430 having the sample size X=2 to calculate the real-time RTT. S1 430 comprises RLC PDU 410 and RLC PDU 412 which have corresponding RTTs of rlcRTT1 510 and rlcRTT2 512. PTRA logic 120 adds rlcRTT1 510 to rlcRTT2 512 to obtain a partial RTT sum. The result of the addition of the RTTs for each PDU is called a "partial" RTT sum to represent that only a subset of and/or not all of the individual RTTs of PDUs corresponding to the UDP datagram have been added. Additionally, PTRA logic 120 determines the partial latency sum by adding the relevant X−1 latency intervals. With a sequence length of two, only a single latency interval is available. The single available latency interval in the present example corresponds to RLC PDU 412. Since, in the example of FIG. 5, there is only a single relevant latency interval, PTRA logic 120 simply assigns latency interval 540 to be the partial latency sum without having to add various latency intervals. PTRA logic 120 extrapolates the partial RTT sum that is based on two PDUs to obtain an estimated RTT sum for all Y PDUs. In one embodiment, PTRA logic 120 extrapolates the partial RTT sum that corresponds to the two PDUs within the selected sequence to an estimated RTT sum that corresponds to the total number "Y" of PDUs that correspond to the UDP datagram, according to the following equation:

estimated RTT sum=partial RTT sum*$Y/X$.

In the preceding equation, the term Y/X provides an averaging operation corresponding to X PDUs and an extrapolation operation corresponding to Y PDUs. Also, PTRA logic 120 extrapolates the partial latency sum that is based on one PDU to obtain an estimated latency for Y−1 PDUs (i.e., 4−1=3 PDUs), in the example of FIG. 5. Similarly, the partial latency sum can be calculated according to the following equation:

estimated latency sum=partial latency sum*$(Y-1)/(X-1)$.

PTRA logic 120 obtains the real-time RTT by the following equation:

Real-time RTT=estimated RTT sum+estimated latency sum.

It is appreciated that in the embodiment illustrated within the RLC layer 307 of FIG. 5, where different individual RTTs are associated with the different PDUs, a more complex analysis can be required to compute the estimated RTT sum and/or the estimated latency sum. For example, PTRA logic 120 can apply a moving average to a calculation of the estimated RTT sum and/or the estimated latency sum.

In response to determining the real-time RTT, PTRA logic 120 determines a bandwidth delay product (BDP), which provides a measure of an amount of data that can be "in transit" within the RF communication channel or "in flight" in the network between WCD 100 and server 180. The Bandwidth Delay Product can be calculated as follows: BDP (bytes)=total available bandwidth (Kbytes/s)×RTT (ms). The BDP is determined based on the real-time RTT and an uplink and a downlink maximum channel rate associated with a corresponding maximum bandwidth from an RAB configuration. In a Wireless Code Division Multiple Access (WCDMA) system, the maximum channel rate is associated with at least one of the following parameters: (a) a maximum number of bits per Transport Block (TB); and (b) a Spreading Factor over a Transmission Time Interval (TTI). The BDP includes an uplink BDP component and a downlink BDP component. By utilizing the corresponding BDP, PTRA logic 120 automatically re-configures at least one of: (a) a size for a TCP receive window (RWIN); and (b) a size for a TCP transmit window (TWIN) at the WCD 100.

When field conditions are optimal for high throughput, several parameter configurations can be tweaked in the TCP stack of the WCD 100 to allow for a boost of performance. For example, more memory buffers can be allocated to TCP sockets. When the conditions degrade, less aggressive allocation methods can be implemented with the added benefit of freeing up some memory for use in other applications. For example, the TCP receive window (RWIN) is one of the TCP parameters which directly affects throughput. The TCP RWIN establishes the amount of data that WCD 100 can accept during downlink communication without acknowledging the sender (e.g., server 180). Further, the TCP TWIN establishes the amount of data that WCD 100 can send during uplink communication without receiving an acknowledgement from the sender (e.g., server 180). Even if there is no packet loss in the network, the size of the RWIN as well as the TWIN can limit throughput. Because TCP enables an amount of data up to the window size to be transmitted before the sender must wait on the acknowledgements, the full bandwidth of the link may not always get used. The limitation caused by window size can be calculated as follows: Throughput <=RWIN/RTT. When the window is too small, throughput is affected as the server can send only a smaller amount of data before requiring an acknowledgment from WCD 100. When the window is too large, there is an increased risk that more packets will have to be retransmitted when a transmission error occurs. When proper TCP buffers are allocated, the TCP RWIN scales accordingly and facilitates a best possible performance. For ideal throughput, PTRA logic 120 sets a size RWIN that is slightly higher than BDP by a preset percentage. At any given time, the window advertised by the receive side of TCP corresponds to the amount of free receive memory that has been allocated for the connection between WCD 100 and server 180. With a properly configured size for RWIN, WCD 100 is less likely to drop received packets due to lack of space. In addition, PTRA logic 120 determines and/or sets a value for an MTU size parameter for the communication channel using previously established associations between radio link quality and RAB assignment.

FIG. 6 is a table of pre-established signal quality ranges and associated values for an MTU size parameter, according to one embodiment. For each detectable signal quality range which is illustrated in a first column of table 600, table 600 provides a corresponding channel description which is illustrated in the second column of Table 600. Furthermore, for each detectable signal quality range, a corresponding pre-established value for an MTU size parameter is illustrated in a third column of Table 600. The fourth and fifth columns provide the corresponding sizes for the transmit buffer size and the receive buffer size, respectively. In one embodiment, signal quality is provided by measuring a pre-established signal strength of a broadcast signal transmitted by BS 145. For example, in one implementation, BS 145 transmits a pilot signal within a common pilot channel (CPICH). The CPICH is a fixed-rate downlink physical channel that carries a pre-defined bit/symbol sequence. In one embodiment, a signal quality range can be obtained from measuring the signal quality of the transmitted pilot signal. Table 600 illustrates measurements of signal quality in terms of the received energy (Ec) of the pilot channel divided by the total noise power (No). In table 600, the term "EcNo" is thus used to represent signal quality. In one embodiment, PTRA logic 120 monitors the signal quality of the link between WCD 100 and BS 120, and using a data structure such as table 600, PTRA logic 120 sets (a) the MTU size parameter, (b) the transmit buffer size, and (c) the receive buffer size, according to the measured signal quality range.

Referring specifically to table 600, first row 602 of table 400 shows that signal quality range "R1" is mapped to a "rank 1" channel rank, and the channel condition description is provided by "description 1". Signal quality range R1 comprises a minimum value "$A_{min}$" and a maximum value "$A_{max}$". In addition, first row 602 indicates that the pre-established value of the MTU size parameter that corresponds to quality range R1 is size "L". The corresponding transmit buffer size and receive buffer size are size N and size P, respectively. Second row 604 is associated with signal quality range "R2" and is presented in a similar manner to the presentation of signal quality range "R1" in first row 602. Signal quality range "R2" can thus be described in a manner similar to a manner in which signal quality range "R1" is described.

In one embodiment, a rank of 1 indicates an excellent channel, which has a highest signal quality range. A rank of the worst channel is a pre-established number that is larger than 1 and is based upon the pre-established level of sensitivity control desired. Third row 606 shows that an "EcNo" that is within a specified higher signal quality range that is higher than a specified medium signal quality range indicates that the channel has a high rank and can be described as a good channel. Third row 606 further indicates that a larger MTU size corresponds to an EcNo that is within a specified larger signal quality range. The corresponding TCP transmit buffer size and TCP receive buffer size are "larger transmit buffer size" and "larger receive buffer size", respectively. Fourth row 608 shows that a signal quality range defined by the medium signal quality range indicates that the channel has a medium rank and can be described as an average channel. Fourth row 608 also indicates that of the corresponding MTU has a medium MTU size. The corresponding TCP transmit buffer size and TCP receive buffer size are medium transmit buffer size and medium receive buffer size, respectively. Similarly, fifth row 610 shows that an "EcNo" that is within a specified lower signal quality range that is below the medium signal quality range indicates that the channel has a low rank and can be described as a poor channel. Fourth row 608 also indicates that the corresponding MTU has a smaller MTU size. The corresponding TCP transmit buffer size and TCP receive buffer size are smaller transmit buffer size and smaller receive buffer size, respectively. It is to be understood that the above variables in the various columns are generally presented for illustration, and can be replaced with specific values within a particular implementation of the disclosure.

PTRA logic 120 responds to changes in radio link quality by setting at least one of the MTU size, the transmit buffer size parameter and the receive buffer size parameter during one of: (a) a current socket connection with end server 180; (b) a next socket connection with end server 180; and (c) a next handshake procedure with the end server 180. By appropriately setting the MTU size, PTRA logic 120 minimizes degradation due to congestion and retransmissions. PTRA logic 120 selects a larger MTU size in a good channel to provide greater efficiency when communicating data between WCD 100 and server 180. Setting the MTU size to a larger size provides greater efficiency since a larger packet carries more user data while protocol overheads, such as headers or underlying delays per packet, remain fixed. The resulting higher efficiency also provides an improvement in throughput. Similarly, PTRA logic 120 selects larger transmit and receive buffer sizes to accompany a larger MTU size within a good channel, and the larger transmit and receive buffer sizes enable a boost in throughput performance.

However, PTRA logic 120 selects a smaller MTU size in a lower quality channel in order to reduce delays to packets that follow in transmission scheduling by mitigating an increase in lag and minimum latency. Furthermore, PTRA logic 120 selects a smaller MTU size in a lower quality channel to reduce retransmissions. At a given bit error rate, a smaller packet is less likely to be corrupted. In addition, retransmissions of smaller packets take less time. Similarly, with a lower quality channel, PTRA logic 120 selects smaller transmit and receive buffer sizes to accompany a smaller MTU size and minimize throughput performance degradation.

Figure 7:
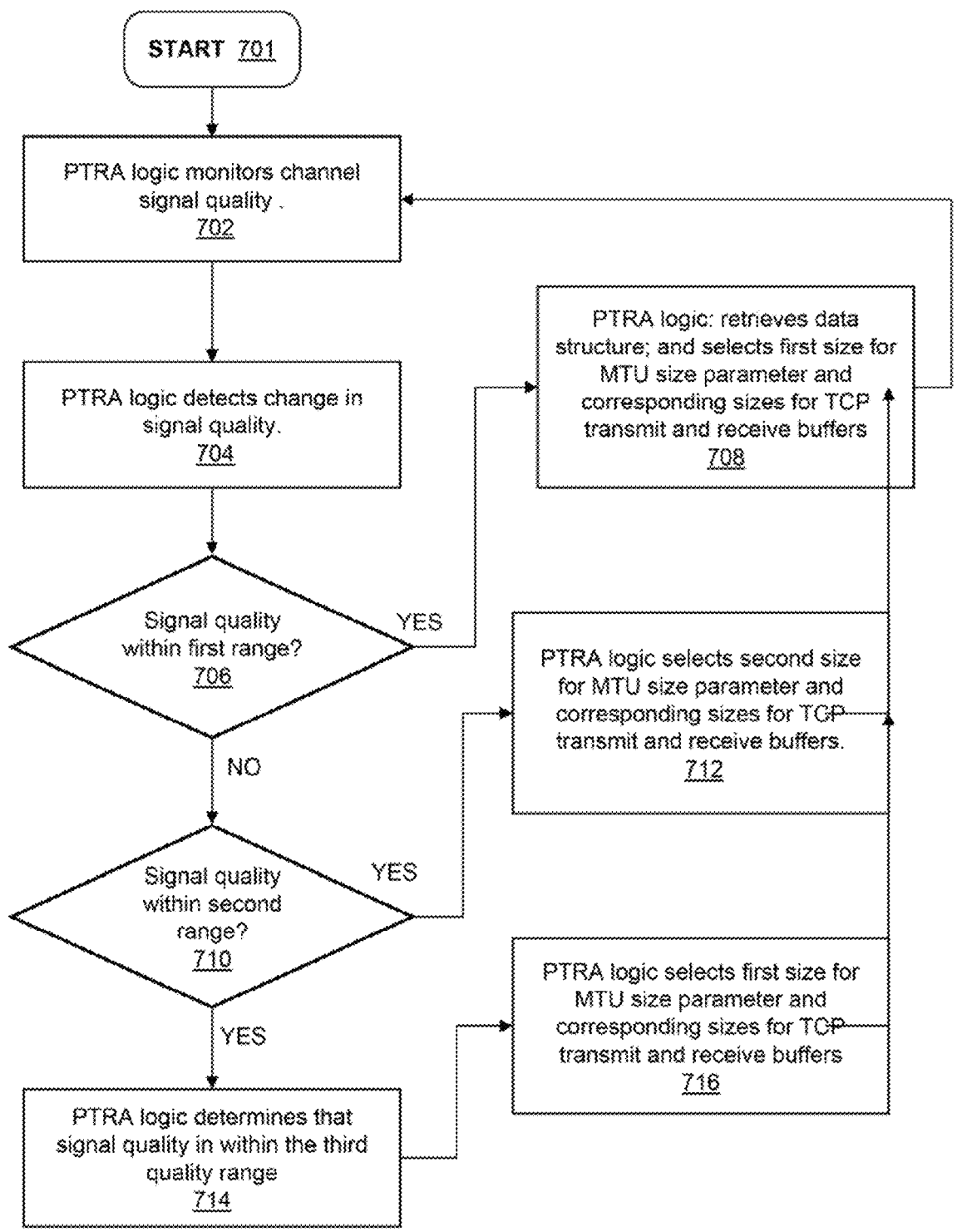
FIG. 7 is a flow chart illustrating the method for determining MTU size and transmit and receive buffers sizes utilizing changes detected in signal quality, according to one embodiment.
Figure 8:
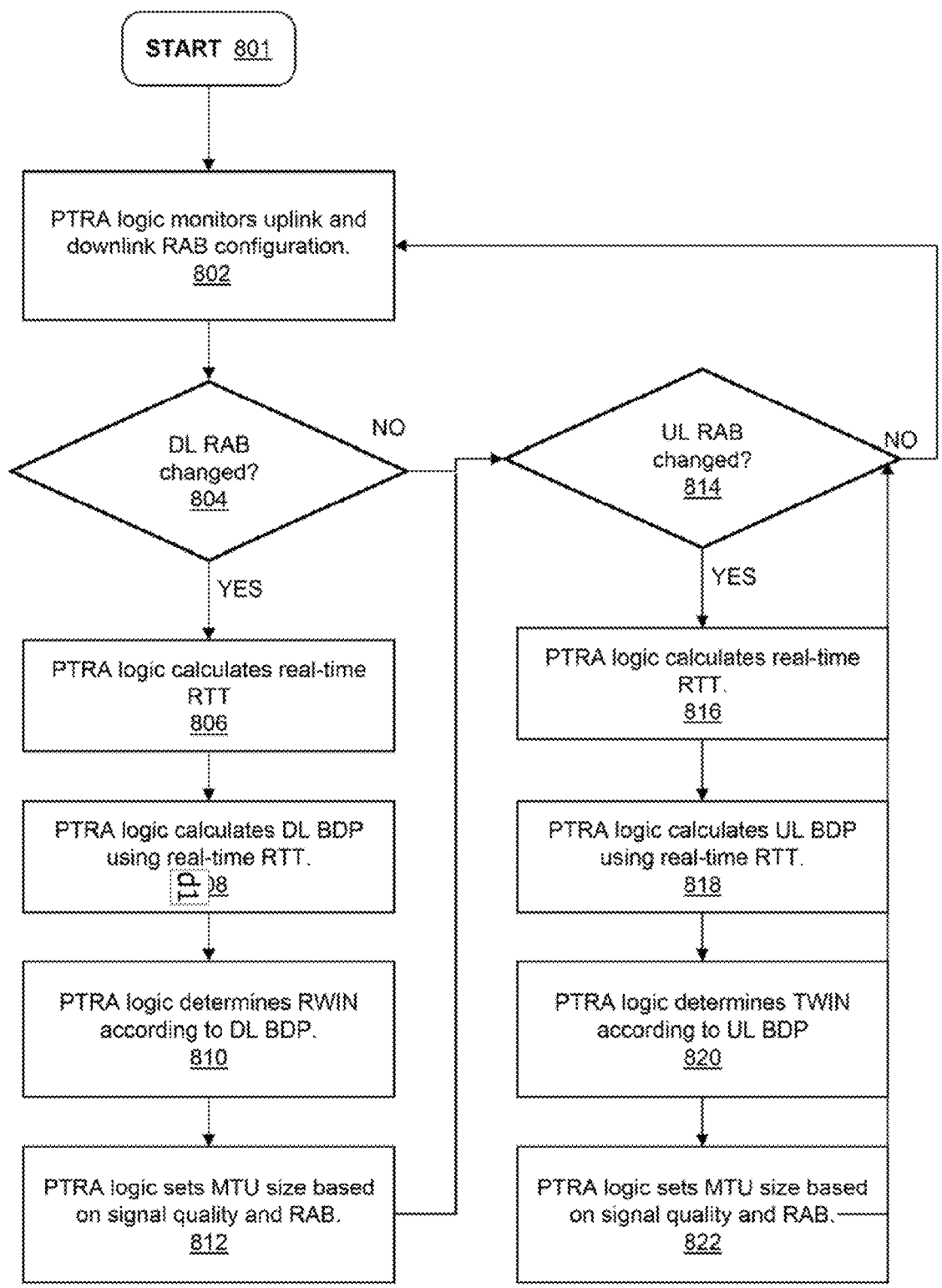
FIG. 8 is a flow chart illustrating the method for triggering a real-time RTT calculation and corresponding adjustments to a Transmission Control Protocol (TCP) receive window (RWIN) and a transmit window (TWIN) utilizing changes in a radio access bearer (RAB) configuration, according to one embodiment.
Figure 9:
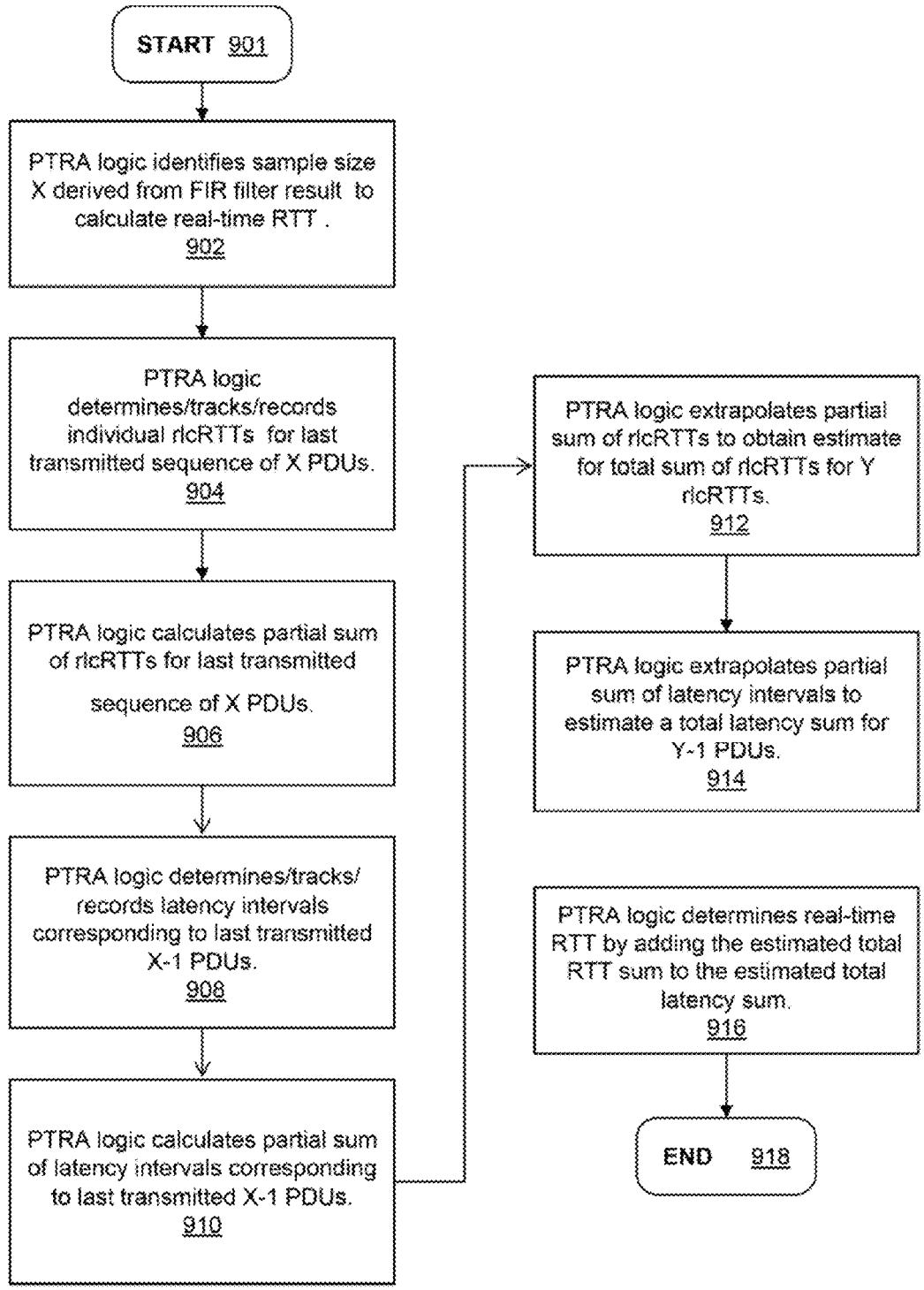
FIG. 9 is a flow chart illustrating the method by which a real-time estimated RTT at the TCP layer is calculated using individual RTTs corresponding to protocol data unit (PDU) transmission on a lower protocol layer, according to one embodiment.

FIGS. 7-9 are flow charts illustrating methods by which the above processes of the illustrative embodiments can be completed. Although the methods illustrated in FIGS. 7-9 may be described with reference to components and functionality illustrated by and described in reference to FIGS. 1-6, it should be understood that this is merely for convenience and alternative components and/or configurations of the devices and data structures can be employed when implementing the various methods. Certain portions of the methods can be completed by PTRA logic 120 executing on one or more processors 105 within WCD 100, such as is generally described in FIG. 1. For simplicity in describing the methods, all method processes are described from the perspective of WCD 100 and/or PTRA logic 120.

FIG. 7 illustrates the method by which detected changes in signal quality are used to determine MTU size, and transmit and receive buffers sizes, according to one embodiment. The method begins at initiator block 701 and proceeds to block 702 at which PTRA logic 120 monitors the channel signal quality such as the Ec/No measurement. At block 704, PTRA logic 120 detects a change in the channel signal quality. At decision block 706, PTRA logic 120 determines whether the channel signal quality is within a first quality range. If at decision block 706, PTRA logic 120 determines that the channel signal quality is within a first quality range, PTRA logic 120 sets an MTU size parameter to a first size, as shown at block 708. Also, PTRA logic 120 sets the TCP transmit and receive buffer sizes to a first pre-established transmit buffer size and a first pre-established receive buffer size, respectively. In one embodiment, PTRA logic 120 retrieves a data structure such as table 600 and uses pre-established associations of signal quality and resource allocations to select an MTU size, a TCP transmit buffer size and a TCP receive buffer size. However, if at decision block 706, PTRA logic 120 determines that the channel signal quality is not within a first quality range, PTRA logic 120 determines whether the channel signal quality is within a second quality range, as shown at decision block 710. If at decision block 710, PTRA logic 120 determines that the channel signal quality is within a second quality range, PTRA logic 120 sets an MTU size parameter to a second size, as shown at block 712. Also, PTRA logic 120 sets the TCP transmit and receive buffer sizes to a second pre-established transmit buffer size and a second pre-established receive buffer size, respectively. However, if at decision block 710, PTRA logic 120 determines that the channel signal quality is not within the second quality range, PTRA logic 120 determines that the channel signal quality is within a third quality range, as shown at block 714. At block 716, PTRA logic 120 sets an MTU size parameter to a third size. Also, PTRA logic 120 sets the TCP transmit and receive buffer sizes to a third pre-established transmit buffer size and a third pre-established receive buffer size, respectively. Following blocks 708, 712 and 716, the process returns to block 702. In one embodiment, PTRA logic 120 returns to block 702 to monitor changes in signal quality after a pre-established amount of data transfer has occurred. With the example method of FIG. 7, an assumption is made that only three ranges of signal quality are supported. However, as is clear from the descriptions herein, no limitations are established by the described method, which is presented as a single embodiment of multiple alternate embodiments and implementations thereof. Further, while described as a first, second, and third MTU size and/or transmit and receive buffer sizes, it is appreciated that the sizes can overlap and/or be reused for different conditions. For example, the MTU size can remain the same across two different ranges, while the buffer sizes are increased and/or decreased.

FIG. 8 illustrates the method by which changes in RAB configuration can trigger a real-time RTT calculation and corresponding adjustments to RWIN and TWIN, according to one embodiment. The method begins at initiator block 801 and proceeds to block 802 at which PTRA logic 120 monitors receipt of uplink and downlink RAB configuration data provided by RNC 210. At decision block 804, PTRA logic 120 determines whether the downlink RAB configuration has changed. If, at decision block 804, PTRA logic 120 determines that the downlink RAB configuration has not changed, the method proceeds to block 814. However, if at decision block 804, PTRA logic 120 determines that the downlink RAB configuration has changed, PTRA logic 120 calculates the real-time RTT, as shown at block 806. At block 808, PTRA logic 120 calculates the DL BDP using the real-time RTT. At block 810, PTRA logic 120 determines RWIN according to the DL BDP. PTRA logic 120 sets the MTU size based on signal quality and the downlink RAB configuration, as shown at block 812. Following block 812, the process proceeds to block 814.

At decision block 814, PTRA logic 120 determines whether the uplink RAB configuration has changed. If, at decision block 814, PTRA logic 120 determines that the uplink RAB configuration has not changed, the process returns to block 802. However, if at decision block 814, PTRA logic 120 determines that the uplink RAB configuration has changed, PTRA logic 120 calculates the real-time RTT, as shown at block 816. At block 818, PTRA logic 120 calculates the UL BDP using the real-time RTT. At block 820, PTRA logic 120 determines TWIN according to the UL BDP. PTRA logic 120 sets the MTU size based on signal quality and the uplink RAB configuration, as shown at block 822. Following block 822, the process returns to block 802.

FIG. 9 illustrates the method by which an estimated real-time RTT, which estimates actual RTT provided at the TCP layer, is calculated using individual RTTs corresponding to PDU transmission on a lower protocol layer, according to one embodiment. The method begins at initiator block 901 and proceeds to block 902 at which PTRA logic 120 identifies a pre-determined sample size "X" to be used to calculate a partial RTT. In one embodiment, the sample size "X" is a PDU sequence length that is obtained using the FIR filter described in FIGS. 4 and 5. At block 904, PTRA logic 120 obtains, determines, and/or records a sequence of individual lower-layer RTTs (e.g., individual rlcRTTs in an RLC layer implementation) for a last (i.e., most recently) transmitted sequence of "X" PDUs. At block 906, PTRA logic 120 calculates a partial sum of RTT from the individual lower-layer RTTs. PTRA logic 120 also detects, determines, and/or records the latency intervals corresponding to a last transmitted X−1 PDUs of the sequence utilized to calculate the partial sum, as provided at block 908. PTRA logic 120 calculates a partial sum of latency intervals for the X−1 individual PDUs at block 910. From the perspective of an RLC layer implementation, PTRA logic 120 extrapolates the partial sum of lower-layer RTTs (i.e., rlcRTTs) to obtain an estimate for a total sum of rlcRTTs for "Y" rlcRTTs within the corresponding UDP datagram, as shown at block 912. Referring to block 912, the extrapolation operation is performed based upon the partial sum of rlcRTTs. In this case, the partial sum of rlcRTTs can be multiplied by Y/X to obtain the estimate for the total sum of rlcRTTs. Mathematically, an equivalent extrapolation result is obtained by calculating an average of the individual rlcRTTs and multiplying the calculated average by Y. In this latter case, the partial sum of rlcRTTs is divided by X to obtain the average individual rlcRTT and the average rlcRTT is then multiplied by Y to obtain the estimate for the total sum of rlcRTTs. In one embodiment, the value "Y" refers to the number of PDUs at the lower/RLC layer that corresponds to a complete UDP packet or IP datagram at a higher, IP layer. At block 914, PTRA logic 120 extrapolates the partial sum of latency intervals to obtain an estimate for a total latency sum corresponding to Y−1 PDUs. PTRA logic 120 determines the estimated real-time RTT by adding the estimated total RTT sum to the estimated total latency sum, as shown at block 916. The process ends at block 918.

The flowchart, message flow diagram and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. In a wireless communications device (WCD), a method for mitigating transmission control protocol (TCP) data session degradation over a radio link connection with an end server, the method comprising:

monitoring a bandwidth allocation for at least one of an uplink communication and a downlink communication with the end server;

detecting a change in the bandwidth allocation, wherein detecting the change in the bandwidth allocation comprises determining whether a change in at least one of an uplink radio access bearer (RAB) configuration and a downlink RAB configuration has occurred;

in response to detecting the change in the bandwidth allocation, performing a real-time round trip time (RTT) measurement utilizing round trip time intervals corresponding to segments of a User Datagram Protocol (UDP) datagram being transmitted at a lower protocol layer; and modifying at least one of a TCP receive window (RWIN) and a TCP transmit window (TWIN) using the real-time RTT measurement.

2. The method of claim 1, wherein:

the uplink RAB configuration provides an uplink maximum bandwidth and an allowed uplink frame size, wherein the downlink RAB configuration provides a downlink maximum bandwidth and an allowed downlink frame size, and wherein the uplink maximum bandwidth and the downlink maximum bandwidth constitute the bandwidth allocation; and performing the real-time RTT measurement comprises determining the real-time RTT utilizing lower-layer RTTs for packet segments transmitted at one of a radio link control (RLC) layer, a Radio Link Protocol (RLP) layer, a Packet Data Convergence Protocol (PDCP) layer and a Hybrid Automatic Repeat-Request (HARD) protocol layer.

3. The method of claim 2, wherein said determining a real-time RTT further comprises:

selecting a first sample size for a sequence of protocol data units (PDUs) that are transmitted at a lower protocol layer, wherein said first sample size falls within a range of values between a pre-established minimum sample size and a pre-established maximum sample size, wherein the sequence of PDUs having the first sample size represents a subset of a complete set of PDUs having a second, larger sample size at the lower protocol layer, which complete set of PDUs are segments of a single IP layer packet generated at an IP layer, and wherein the first sample size corresponds to a first number of PDUs whose lower-layer RTTs are sufficient to provide an estimated real-time RTT that is expected to be within a specific range of an actual RTT generated at the TCP layer for the single IP layer packet.

4. The method of claim 3, further comprising:

computing (a) a partial RTT sum that includes a summation of the first number of individual lower-layer RTTs corresponding to transmission and acknowledgement of each of the first number of individual PDUs within the sequence of PDUs of the sample size and (b) a corresponding wait time latency sum of sequential latency intervals between receipt of an acknowledgement of a successful transmission of a preceding PDU in the sequence and subsequent transmission of a next PDU in the sequence of PDUs of the first sample size; and calculating a current estimate of real-time RTT by: extrapolating the partial RTT sum associated with the sample size to an estimated RTT sum for the complete set of PDUs corresponding to the single IP layer packet; extrapolating the corresponding wait time latency sum to an estimated wait time latency sum associated with the complete set of PDU; and adding the estimated RTT sum to the estimated wait time latency sum to obtain a real-time RTT; and assigning the real-time RTT for utilization as a current TCP RTT for processes at the WCD involving the current TCP RTT.

5. The method of claim 2, further comprising:

determining a bandwidth delay product (BDP) providing a measure of an amount of data that is within the radio frequency (RF) communication channel between the WCD and the end server at a corresponding time instant, wherein said BDP is determined based on the real-time RTT and an uplink and a downlink maximum channel rate associated with a corresponding maximum bandwidth from an RAB configuration, wherein the BDP includes an uplink BDP component and a downlink BDP component;

automatically re-configuring at least one of (a) a size for a TCP receive window (RWIN) and (b) a size for a TCP transmit window (TWIN) based on a corresponding BDP; and setting a value for a maximum transmission unit (MTU) size parameter for the RF communication link using previously established associations between radio link quality RAB assignment.

6. The method of claim 1, further comprising:

measuring a radio link quality for a downlink communication channel of the WCD;

retrieving a data structure that provides pre-established associations between radio link quality and at least one of: (a) maximum transmission unit (MTU) size parameter; (b) TCP transmit data buffer size parameter; and (c) TCP receive data buffer size parameter;

determining a range from among a plurality of radio link quality ranges in which the radio link quality falls; and in response to the radio link quality being within a first range of a plurality of radio link quality ranges: (a) setting an MTU size for packet transmission to a first size that is associated with the first range of the plurality of radio link quality ranges; (b) setting a TCP transmit data buffer size parameter to a transmit buffer size that is associated with the first range of radio link quality ranges; and (c) setting a TCP receive data buffer size parameter to a receive data buffer size that is associated with the first range of the plurality of radio link quality ranges.

7. The method of claim 6, wherein:

the plurality of radio link quality ranges are used to provide a level of control sensitivity for resource allocation based on radio link quality; and the method further comprises:

in response to the radio link quality being within the first range of the plurality of radio link quality ranges, setting an MTU size to a first size;

monitoring for a change in the radio link quality;

automatically adjusting the size of the MTU in real-time in response to detecting a change in the radio link quality that moves a current signal quality from being within one pre-established radio link range to a different radio link quality range among the plurality of radio link quality ranges, wherein each of the plurality of radio link quality ranges is associated with a corresponding pre-determined size to be utilized for the MTU.

8. The method of claim 6, further comprising:

monitoring the radio link quality and the channel bandwidth allocation before and after an establishment of a data connection between the WCD and the end server; and responding to changes in the radio link quality by setting at least one of the MTU size, the TCP transmit buffer size parameter, and the TCP receive buffer size parameter during one of: (a) a current socket connection with the end server; (b) a next socket connection with the end server; and (c) a next handshake procedure with the end server; and wherein said modifying at least one of a TCP receive window (R WIN) and a TCP transmit window (TWIN) occurs during one of: (a) the current socket connection with the end server; (b) the next socket connection with the end server; and (c) the next handshake procedure with the end server.

9. In a wireless communications device (WCD), a method comprising:

measuring a radio link quality for a downlink communication channel of the WCD, wherein said measured radio link quality falls within a first range of a plurality of radio link quality ranges;

determining that a change in at least one of an uplink radio access bearer (RAB) configuration and a downlink RAB configuration has occurred, wherein the uplink RAB configuration provides an uplink maximum bandwidth and an allowed uplink frame size, and wherein the downlink RAB configuration provides a downlink maximum bandwidth and an allowed downlink frame size; and in response to the determining, setting: (a) a maximum transmission unit (MTU) size to a first size that is associated with the first range; (b) a transmission control protocol (TCP) transmit buffer size parameter to a transmit buffer size that is associated with the measured radio link quality; and (c) a TCP receive buffer size parameter to a receive buffer size that is associated with the measured radio link quality.

10. The method of claim 9, wherein said setting an MTU size further comprises:

monitoring for a change in the radio link quality; and automatically adjusting the size of the MTU in real-time in response to detecting a change in the measured radio link quality that moves a current signal quality from being within one pre-established radio link quality range to a different radio link quality range among the plurality of radio link quality ranges, wherein each of the plurality of radio link quality ranges is associated with a corresponding pre-determined size to be utilized for the MTU, wherein the plurality of radio link quality ranges are used to provide control sensitivity for resource allocation based on radio link quality.

11. The method of claim 9, further comprising:

performing a real-time round trip time (RTT) measurement by determining the real-time RTT utilizing lower-layer RTTs for packet segments transmitted at one of a radio link control (RLC) layer, a radio link protocol (RLP) layer, a Packet Data Convergence Protocol (PDCP) layer and a Hybrid Automatic Repeat-Request (HARD) protocol layer;

determining a bandwidth delay product (BDP) providing a measure of an amount of data that is within the RF communication channel between the WCD and the end server at a corresponding time instant, wherein said BDP is determined based on the real-time RTT and an uplink and a downlink maximum channel rate associated with a corresponding maximum bandwidth from an RAB configuration, wherein the BDP includes an uplink BDP component and a downlink BDP component;

automatically re-configuring at least one of (a) a size for a TCP receive window (RWIN) and (b) a size for a TCP transmit window (TWIN) based on a corresponding BDP; and setting a value for an MTU size parameter for the RF communication link using previously established associations between radio link quality RAB assignment.

12. The method of claim 11, wherein said determining a real-time RTT further comprises:

selecting a first sample size for a sequence of protocol data units (PDUs) that are transmitted at a lower protocol layer, wherein said first sample size falls within a range of values between a pre-established minimum sample size and a pre-established maximum sample size, wherein the sequence of PDUs having the first sample size represents a subset of a complete set of PDUs having a second, larger sample size at the lower protocol layer, which complete set of PDUs are segments of a single IP layer packet generated at an IP layer, and wherein the first sample size corresponds to a first number of PDUs whose lower-layer RTTs are sufficient to provide an estimated real-time RTT that is within a specific range of an actual RTT generated at the TCP layer for the single IP layer packet.

13. The method of claim 12, further comprising:

computing (a) a partial RTT sum that includes a summation of the first number of individual lower-layer RTTs corresponding to transmission and acknowledgement of each of the first number of individual PDUs within the sequence of PDUs of the sample size and (b) a corresponding wait time latency sum of sequential latency intervals between receipt of an acknowledgement of a successful transmission of a preceding PDU in the sequence and subsequent transmission of a next PDU in the sequence of PDUs of the first sample size; and calculating a current estimate of real-time RTT by: extrapolating the partial RTT sum associated with the sample size to an estimated RTT sum for the complete set of PDUs corresponding to the single IP layer packet; extrapolating the corresponding wait time latency sum to an estimated wait time latency sum associated with the complete set of PDU; and adding the estimated RTT sum to the estimated wait time latency sum to obtain a real-time RTT; and assigning the real-time RTT for utilization as a current TCP RTT for processes at the WCD involving the current TCP RTT.

14. The method of claim 11, wherein the uplink maximum bandwidth and the downlink maximum bandwidth constitute the bandwidth allocation, further comprising:

monitoring the radio link quality and the bandwidth allocation before and after an establishment of a data connection between the WCD and the end server; and responding to changes in the radio link quality by setting at least one of the MTU size, the TCP transmit buffer size parameter, and the TCP receive buffer size parameter during one of: (a) a current socket connection with the end server; (b) a next socket connection with the end server; and (c) a next handshake procedure with the end server; and wherein said modifying at least one of a TCP receive window (RWIN) and a TCP transmit window (TWIN) occurs during one of: (a) the current socket connection with the end server; (b) the next socket connection with the end server; and (c) the next handshake procedure with the end server.

15. A wireless communication device (WCD) comprising:
a processor;
a wireless transceiver;

a storage accessible to the processor and having stored thereon a utility which when executed on the processor provides logic that causes the wireless communication device to:

monitor a bandwidth allocation for at least one of an uplink communication and a downlink communication with the end server;

measure a radio link quality for a downlink communication channel of the WCD;

set a maximum transmission unit (MTU) size to a pre-established size that is associated with the measured radio link quality;

detect a change in the bandwidth allocation, wherein to detect a change in the bandwidth allocation includes determining whether a change in at least one of an uplink radio access bearer (RAB) configuration and a downlink RAB configuration has occurred;

in response to detecting the change in the bandwidth allocation, perform a real-time round trip time (RTT) measurement utilizing round trip time intervals corresponding to segments of a User Datagram Protocol (UDP) datagram being transmitted at a lower protocol layer; and modify at least one of a transmission control protocol (TCP) receive window (RWIN) and a TCP transmit window (TWIN) using the real-time RTT measurement.

16. The device of claim 15, wherein said logic that sets an MTU size further comprises logic that causes the WCD to:

in response to the measured radio link quality being within a first range of a plurality of radio link quality ranges, set the MTU size to a first size;

monitor for a change in the radio link quality;

automatically adjust the size of the MTU in real-time in response to detecting a change in the radio link quality that moves a current signal quality from being within one pre-established signal quality range to a different signal quality range among the plurality of radio link quality ranges, wherein each of the plurality of signal quality ranges is associated with a corresponding predetermined size to be utilized for the MTU; and in response to determining that the radio link quality is at a specific radio link quality range: (a) set the TCP transmit buffer size parameter to a pre-established transmit buffer size that is associated with the specific radio link quality range; and (b) set the TCP receive buffer size parameter to a pre-established receive data buffer size that is associated with the specific radio link quality range, wherein the plurality of different radio link quality ranges are used to provide granular control sensitivity for resource allocation based on radio link quality.

17. The device of claim 15, wherein the uplink RAB configuration provides an uplink maximum bandwidth and an allowed uplink frame size, wherein the downlink RAB configuration provides a downlink maximum bandwidth and an allowed downlink frame size, and wherein the uplink maximum bandwidth and the downlink maximum bandwidth constitute the bandwidth allocation;

wherein the logic further causes the WCD to:

in response to detecting a change in at least one of the uplink RAB configuration and the downlink RAB configuration, determine a real-time RTT utilizing lower-layer RTTs for packet segments transmitted at one of a radio link control (RLC) layer, a Radio Link Protocol (RLP) layer, a Packet Data Convergence Protocol (PDCP) layer and a Hybrid Automatic Repeat-Request (HARD) protocol layer;

determine a bandwidth delay product (BDP) providing a measure of an amount of data that is within the RF communication channel between the WCD and the end server at a corresponding time instant, wherein said BDP is determined based on the real-time RTT and an uplink and a downlink maximum channel rate associated with a corresponding maximum bandwidth from an RAB configuration, wherein the BDP includes an uplink BDP component and a downlink BDP component;

automatically re-configure at least one of (a) a size for a TCP receive window (RWIN) and (b) a size for a TCP transmit window (TWIN) based on a corresponding BDP; and set a value for an MTU size parameter for the RF communication link using previously established associations between radio link quality and RAB assignment.

18. The device of claim 17, wherein said logic that causes the WCD to determine a real-time RTT further comprises logic that causes the WCD to:

select a first sample size for a sequence of protocol data units (PDUs) that are transmitted at a lower protocol layer, wherein said first sample size falls within a range of values between a pre-established minimum sample size and a pre-established maximum sample size, wherein the sequence of PDUs having the first sample size represents a subset of a complete set of PDUs having a second, larger sample size at the lower protocol layer, which complete set of PDUs are segments of a single IP layer packet generated at an IP layer, and wherein the first sample size corresponds to a first number of PDUs whose lower-layer RTTs are sufficient to provide an estimated real-time RTT that is within a specific range of an actual RTT generated at the TCP layer for the single IP layer packet.

19. The device of claim 18, further comprising logic that causes the WCD to:

compute (a) a partial RTT sum that includes a summation of the first number of individual lower-layer RTTs corresponding to transmission and acknowledgement of each of the first number of individual PDUs within the sequence of PDUs of the sample size and (b) a corresponding wait time latency sum of sequential latency intervals between receipt of an acknowledgement of a successful transmission of a preceding PDU in the sequence and subsequent transmission of a next PDU in the sequence of PDUs of the first sample size; and calculate a current estimate of real-time RTT by: extrapolating the partial RTT sum associated with the sample size to an estimated RTT sum for the complete set of PDUs corresponding to the single IP layer packet; extrapolating the corresponding wait time latency sum to an estimated wait time latency sum associated with the complete set of PDU; and adding the estimated RTT sum to the estimated wait time latency sum to obtain a real-time RTT; and assign the real-time RTT for utilization as a current TCP RTT for processes at the WCD involving the current TCP RTT.

20. The device of claim 16, further comprising logic that causes the WCD to:

monitor the radio link quality and the bandwidth allocation before and after an establishment of a data connection between the WCD and the end server; and respond to changes in the radio link quality by setting at least one of the MTU size, the TCP transmit buffer size parameter, and the TCP receive buffer size parameter during one of: (a) a current socket connection with the end server; (b) a next socket connection with the end server; and (c) a next handshake procedure with the end server; and wherein said WCD modifies at least one of a TCP receive window (RWIN) and a TCP transmit window (TWIN) occurs during one of: (a) the current socket connection with the end server; (b) the next socket connection with the end server; and (c) the next handshake procedure with the end server.

* * * * *